United States Patent [19]

Bettin et al.

[11] 4,406,442

[45] Sep. 27, 1983

[54] ROTARY VALVE

[75] Inventors: Leonard A. Bettin, Lyons; Imre Galos, Downers Grove; Donald J. Dufour, Hinsdale, all of Ill.

[73] Assignee: International Harvester Co., Chicago, Ill.

[21] Appl. No.: 319,008

[22] Filed: Nov. 6, 1981

Related U.S. Application Data

[60] Continuation of Ser. No. 295,274, Aug. 24, 1981, which is a division of Ser. No. 114,190, Jan. 22, 1980, abandoned.

[51] Int. Cl.³ .............................................. F16K 3/26
[52] U.S. Cl. ................................... 251/310; 251/312; 251/283; 137/625.47; 137/269
[58] Field of Search ................... 137/625.47; 251/310, 251/283, 312, 214

[56] References Cited

U.S. PATENT DOCUMENTS

| | | | |
|---|---|---|---|
| 1,517,877 | 12/1924 | Wallem | 251/283 |
| 2,312,941 | 3/1943 | Tucker | 251/283 |
| 2,766,962 | 10/1956 | Fodor | 251/310 |
| 2,850,041 | 9/1958 | Radanof | 137/625.47 |

Primary Examiner—Alan Cohan
Attorney, Agent, or Firm—Boris Parad; F. David AuBuchon

[57] ABSTRACT

A rotary valve having a hollow spool with a metering notch rotatable on a sleeve which is pressed into a valve body, the sleeve having an opening selectively and progressively alignable with said notch. A thrust needle bearing is trapped between a shoulder on the spool and a cap threaded into the valve body. A passage freely transmits pressure inside said hollow spool to the side of the bearing opposite said shoulders to reduce the thrust force imposed on said bearing.

4 Claims, 2 Drawing Figures

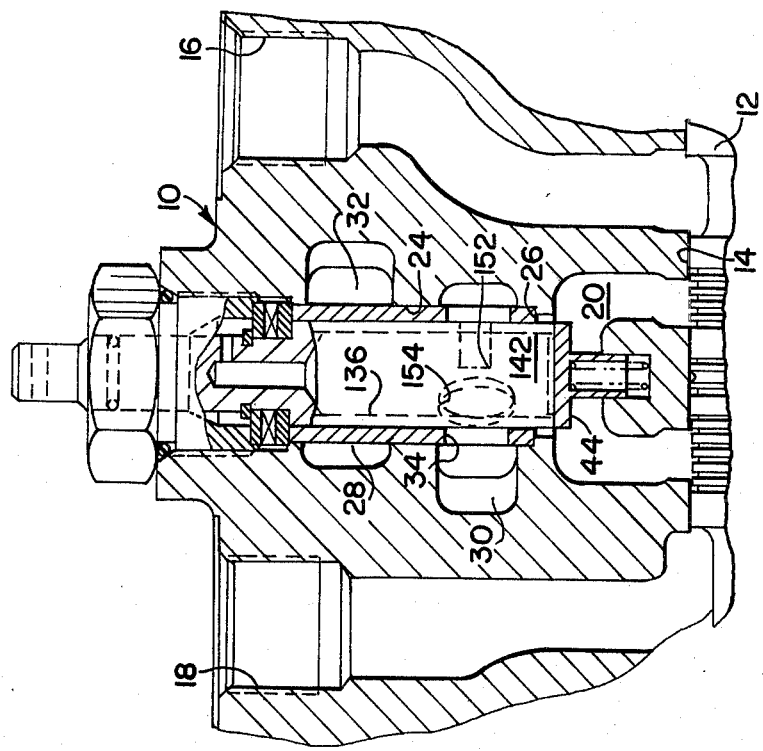
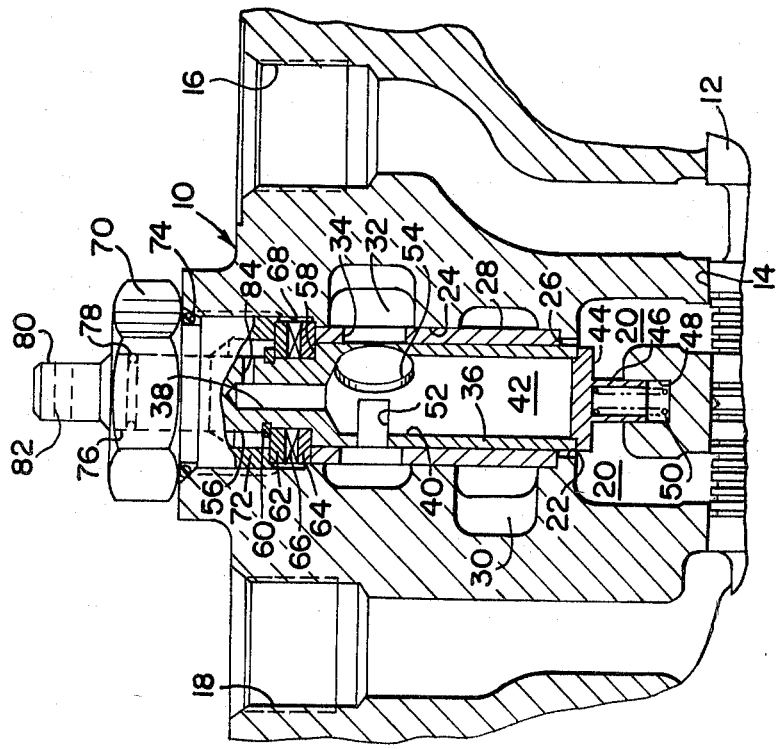

ROTARY VALVE

This is a continuation of application Ser. No. 295,274 filed 8/24/81 which is a divisional application of Ser. No., 114,190 filed 1/22/80 and now abandoned.

BACKGROUND AND SUMMARY OF THE INVENTION

This invention relates generally to rotary valves and more particularly to such valves which are subjected to axial pressures resulting in axial thrust loads on the rotary spool.

While rotary valves have been widely used in hydraulics for some time, it has been recognized that the axial thrust loads often imposed upon the rotary spool requires a relatively high torque in order to rotate the spool. Since such valves are frequently used to meter fluid flow, a high torque level is undesirable. First, because the coefficient of static friction is higher than the coefficient of sliding friction, it is difficult to make relatively small control movements with the precision necessary to achieve the desired changes in flow rate. Second, the moment arm required to provide the needed rotational torque complicates the control mechanism therefor because excessive travel is often required. And finally, the use of push-pull or Bowden cables as a control means frequently places an upper limit on the force that can be transmitted to the movement arm. It is, therefore, apparent that a rotary valve structure which requires a low rotational torque to turn the rotary spool in such a valve is highly desirable.

Since rotary valves are frequently used in a valve body with plural pressure supply ports or in plural valve bodies having pressure supply ports located at different levels therein, it is often necessary to design the sleeve so that it is complementary to each of the rotary valve spools, which increases the cost of manufacture as well as multiplying the number of stock parts nad complicating servicing of the valves.

It is, therefore, an object of this invention to provide a rotary valve in which the rotational torque required to adjsut its angular position is low.

It is also an object of this invention to provide a rotary valve which can readily be adjusted or positioned solely through force transmitted by push-pull or Bowden cables.

It is a further object of this invention to provide a rotary valve in which the axial force creating the frictional force resisting rotation thereof is minimized.

It is a still further object of this invention to provide a rotary valve for use in a plurality of valve bodies with components which are common, which are less expensive to manufacture and which deminishes the number of stock components.

These and other objects of the present invention, and many of the attendant advantages thereof, will become more readily apparent upon a perusal of the following description and the accompanying drawings, wherein:

FIG. 1 is an elevational view, mostly in section, of a valve body incorporating a rotary valve according to the present invention; and FIG. 2 is an elevational view similar to FIG. 1, but illustrating the use of a common component from the rotary valve of FIG. 1 in another embodiment of a rotary valve according to the present invention.

DESCRIPTION OF PREFERRED EMBODIMENTS

Referring now to FIG. 1, there is shown a valve body, indicated generally at 10, which includes a directional control spool, shown partially at 12. The spool 12 is axial shiftable within a bore 14 formed in the valve body 10 and is of the closed-center type. The spool 12 directs hydraulic fluid under pressure to one of the ports 16 and 18 while connecting the other one of these ports to tank in a conventional and well known manner, although reference may be had to U.S. patent application Ser. No. 5,048 filed Jan. 22, 1979 by Leonard A. Bettin and entitled Pressure Flow Compensated Hydraulic Priority System Providing Signals Controlling Priority Valve, for a more detailed description of the particular valve shown herein.

A branched supply port 20 communicates with the bore 14 with both branches being blocked by spool 12 in its center neutral position and port 16 only connected to port 20 when the spool 12 is shifted to the left and port 18 only connected to support 20 when the spool 12 is shifted to the right, as viewed in FIG. 1.

A bore 22 extends from the exterior of valve body 10 and intersects the supply port 20. A counterbore 24 forms a shoulder at 26 to accept a sleeve 28 which is pressed into the counterbore 24 and into engagement with the shoulder 26. The sleeve 28 serves to isolate two separate high pressure, supply chambers 30 and 32. A cross bore 34 is provided in the sleeve 28 and is positioned longitudinally in the sleeve 28 so that it may communicate with the upper supply chamber 32. A rotary valve spool 36 is rotatably mounted in the sleeve 28. The spool is bored at 38 and counterbored at 40 to provide a thin-walled, hollow section 42. A check valve 44 is engageable with the open end of section 42 and prevents back flow of hydraulic fluid from the supply port 20 into the hollow section 42. For guidance, and to assure seating of the check valve 44 when the spool 12 is in center neutral position, a guide stem 46 on the valve 44 is reciprocable in a bore 48 with a light compression spring 50 trapped within the stem 46 and the bottom of the bore 48.

The hollow section 42 of the spool 36 is provided with appropriate metering notches. The notches are alignable with the cross bore 34 and are designed to give the desired flow rate at each incremental angular position of the spool 36 relative to the sleeve 28. As shown in FIG. 1, these notches comprise a milled slot 52 and a circular opening 54, which are timed so that the slot 52 will initially engage or communicate with the cross bore before the circular opening 54. The spool 36 is provided with a reduced diameter portion 56 forming a shoulder 58. A snap ring 60 is seated in a groove formed in the portion 56 a distance from the shoulder 58 to retain therebetween a pair of thrust washers 62 and 64 positioned on each side of a needle bearing type of thrust bearing 66.

A second counter-bore 68 provides clearance for the periphery of the bearing 66 A cap 70 having an annular collar 72 is threaded into the second counter-bore 68 and lighty engages the upper thrust washer 62 to provide a reaction member for the thrust bearing 66, in a manner to be explained hereinafter, but engages the outer surface of the valve body 10 before exerting any appreciably compressive load on the bearing 66. An o-ring 74 seals the enlarged cap 70 and the threaded portion of the counterbore 68. A stem 76 on the spool 36 extends through, and is rotatable in the cap 70, with an O-ring 78 providing a seal therebetween. A suitable lever may be attached to the reduced diameter portion 80 of the stem 76, as by insertion of a pin through the lever and the hole 82 formed in the portion 80. A Bowden cable may be attached to actuate the lever as shown in U.S. application Ser. No. 114,179, filed the same day as this application by Robert J. Oliver et al and entitled Remote Control Arrangement For Flow Rate Valve now U.S. Pat. No. 4,310,026.

It will be seen that the pressure in the hollow section 42 will result in a thrust force on the spool 36 acting in an upward direction. This force will urge the lower thrust washer 64 against the bearing 66 which will in turn urge the upper thrust washer against the lower surface of the annular collar 72. As a result of the upward force on the spool 36, the spool 36 will lift slightly, raising the shoulder 58 on the spool 36 above the other end of the sleeve 28 just enough to permit the lower washer 64 to turn with the spool 36 without dragging on the stationary sleeve. Similarly, the snap ring 60 will move up slightly permitting the upper washer 62 to engage the stationary annular collar 72. The thrust bearing 66 is, therefore, permitted to minimize the frictional resistance to rotation of the spool 36 in the sleeve 28. As a result, the metering of fluid through the rotary valve will be more precise.

The frictional resistance can be lowered even more if the net upward force acting on the spool 36 is reduced. This is accomplished by providing a small cross bore 84 through the stem 76 and into communication with the bore 38. The pressure within the hollow section 42 can thereby be communicated to the upper surface of the thrust washer 62 and will act downward in opposition to the upward force of the pressure within the hollow section 42. The net force acting on the spool is therfore reduced and the resulting frictional force is correspondingly reduced.

Referring now to FIG. 2, it will be seen that the sleeve 28 has been inverted from its position shown in FIG. 1, so that the cross bore 34 is now in communication with the chamber 30. All elements in FIG. 2 are the same as those shown and described in connection with FIG. 1, except that each altered component has had the numeral 1 added as a superscript to the number of its corresponding component in FIG. 1. Thus, the spool 136 has the metering notches, which may be identical in shape to those of FIG. 1, located so that they are at the elevation of the lower chamber 30. The sleeve 28 is pressed into the counterbore 24 in the same way and serves to isolate the two chambers 30 and 32. By positioning the cross bore 34, so that it will communicate with either the upper chamber 32 or the lower chamber 30 when inverted, it is possible to use the same component part for the two valve arrangements, the valve of FIG. 2 permitting flow control of the fluid between supply chamber 30 and the port 20 in the same manner as the valve of FIG. 1 did between supply chamber 32 and the port 20. The advantages of two separate high pressure, supply chambers, such as 30 and 32, has been described in connection with the aforementioned Ser. No. 5,048 filed Jan. 22, 1979, and reference may be made thereto for a more complete explanation of such advantages.

It will be seen from the foregoing that preferred embodiments of the present invention have been shown and described. However, various changes and modifications may be made by those of skill in the art without departing from the spirit of the invention as defined by the scope of the appended claims.

What is claimed is:

1. A rotary valve for precise metering of fluid flow comprising:
   a valve body having a first supply chamber and a supply port;
   a bore intersecting said chamber and port;
   a sleeve pressed into said bore;
   a cross bore in said sleeve communicating with said chamber;
   a hollow rotary valve spool rotatable in said sleeve;
   said spool having metering notches capable of selective registry with said cross bore;
   a shoulder formed on said spool substantially level with the outer end of said sleeve;
   a first thrust washer engaging said shoulder and overlying said sleeve;
   a cap connected to said valve body and having an inner annular collar;
   a second thrust washer engaging said collar;
   a thrust bearing positioned between said washers; and
   the combined thickness of said bearing and said washers being slightly less than the distance from the top of said sleeve to the bottom of said collar whereby pressure in said hollow spool will lift said bottom washer off said sleeve to minimize the frictional resistance to rotation of said first washer relative to said sleeve.

2. A rotary valve according to claim 1, wherein the inner end of said spool extends below said sleeve to said supply port to define a valve seat;
   a check valve engageable with said seat to permit flow only from said hollow spool into said supply port; and
   a spring cable of maintaining said valve against said seat when said spool is urged upward and said check valve opens only when the pressure in said hollow spool exceeds the pressure in said supply port.

3. A rotary valve according to claim 2, and further comprising: passage means extending from the interior of said hollow spool to the outer surface of said thrust washer.

4. A rotary valve according to claim 2 or 3 wherein said thrust bearing is a needle type bearing.

* * * * *